United States Patent [19]

Mayle

[11] Patent Number: 4,885,804
[45] Date of Patent: Dec. 5, 1989

[54] OPTICAL TRANSMITTING AND RECEIVING APPARATUS

[76] Inventor: Eugene E. Mayle, 319 Kammer Ave., Dayton, Ohio 45417

[21] Appl. No.: 191,546

[22] Filed: May 9, 1988

[51] Int. Cl.$^4$ .............................................. H04B 9/00
[52] U.S. Cl. .................................... 455/606; 455/615; 455/617
[58] Field of Search ............... 455/606, 607, 609, 611, 455/613, 615, 617, 618, 619; 370/3

[56] References Cited

U.S. PATENT DOCUMENTS

| | | | | |
|---|---|---|---|---|
| 4,173,016 | 10/1979 | Dickson | ................................ | 455/38 |
| 4,348,740 | 9/1982 | White | ................................ | 455/607 |
| 4,561,119 | 12/1985 | Epworth | ............................ | 455/618 |

FOREIGN PATENT DOCUMENTS 0018133 1/1987 Japan .................................... 455/619

Primary Examiner—Robert L. Griffin
Assistant Examiner—Leslie Van Beek

[57] ABSTRACT

An optical transceiver worn on the person acts as a matchmaker by continually transmitting and responding to a predetermined frequency band selected by the wearer and corresponding to a major compatibility trait. Response occurs simultaneously between atuned transceivers in the form of pulsing light emitting diodes (L.E.D.'s). The pulse rate and brightness of the L.E.D.'s are visual indications of the degree of atunement between the transceivers. Through the use of subminiature low-power devices, the apparatus including lithium power cell can be worn as jewelry. By transmitting in the infrared region of the electromagnetic spectrum, the apparatus remains inconspicuous.

9 Claims, 4 Drawing Sheets

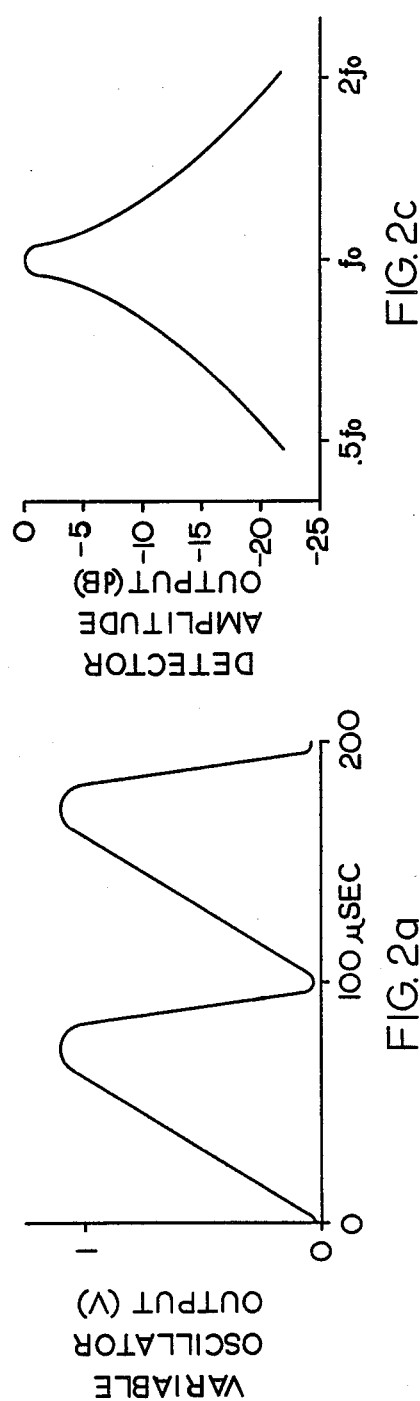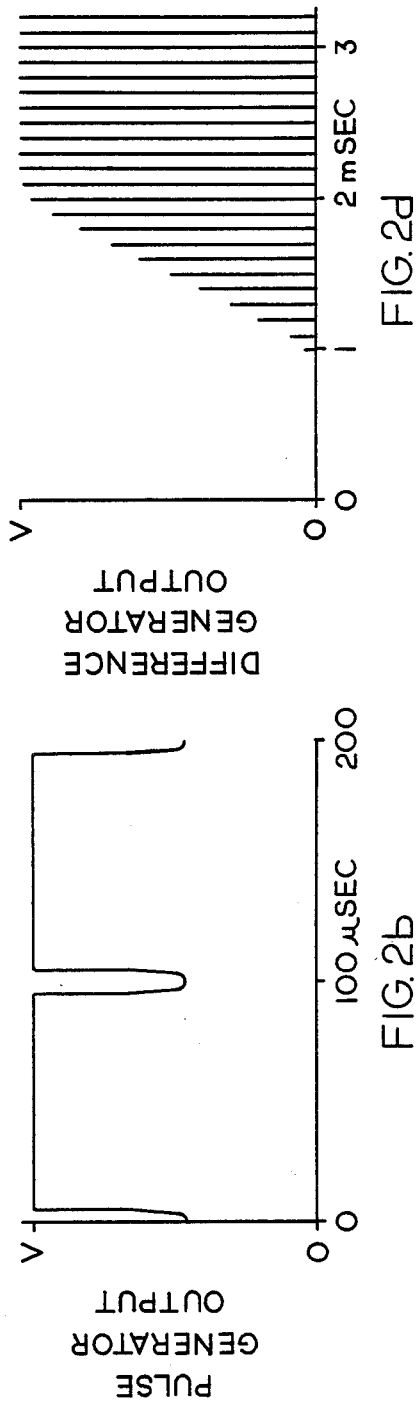

OPTICAL TRANSMITTING AND RECEIVING APPARATUS

BACKGROUND OF THE INVENTION

1. Field of the Invention

This invention relates to an optical transceiver, and particularly to a limited message transceiving apparatus utilizing pulsed signals of fixed duration and L.E.D.'s.

2. Description of the Prior Art

It is desirable for individuals searching for a friend or friends to have a method of continually and unoffensively presenting themselves to those with whom they share common interests. Concurrent with this aim is the desire to keep private, one's interests, from those who do not share the same. A portable apparatus which: can invisibly transmit a predetermined message, can in like manner receive that same message, and can cognitively acknowledge said reception is sought.

Currently personal introductions may be described as belonging to one of two types: the direct method, or the indirect method. Either of these methods can be further categorized as being: active, or passive. The direct active (D.A.) method is exemplified by an individual who willfully enters a social environment for the purpose of obtaining the companionship of a stranger. D.A. social environments include parties, singles bars, discos, etc. This method generally requires an outgoing individual who is not afraid of rejection. Introduction is spurred primarily by a physical attraction and is therefore superficial. The direct passive (D.P.) method is exemplified by an individual who finding himself or herself in a social environment conincidentally discovers another individual with a common interest. The D.P. environments are normally confined to the daily routine environments such as work, school, shopping stores, etc. This method of introduction is rare in nonroutine environments because the attraction is not normally physical and requires repeated exposures. There can already be shown advantages and disadvantages of active vs passive introduction. The number of introductions by the active method is logically greater than the passive, but the investment in time and the emotional stress is much greater. The indirect active (I.A.) method is demonstrated by an individual who willfully utilizes an intermediate communication medium to search for and screen potential companions. These intermediate communication mediums include dating services, personal ads, bulletin boards, as well as relatives and friends. The I.A. individual is usually for one or more reasons less sociable than the D.A. individual but generally more sincere. This method of introduction can be expensive as well as iterative because of inexact translations into the intermediate communication medium. Finally, the indirect passive (I.P.) method of introduction is demonstrated when a mutual aquaintence of two individuals (supposed to be in need of companionship) assumes responsibility for their introduction. These individuals may or may not desire companionship. The mutual aquaintence is usually a relative or friend but may be a member of a social or institutional organization.

SUMMARY OF THE INVENTION

An aim of this invention is to bridge the gap between direct, indirect, active, and passive methods of personal introduction. By carrying a discriminating transceiver on one's person that communicates a preselected message, an indirect method of introduction is available to compliment or narrow direct methods. By continually transmitting with or without conscious effort the invention can be used actively as well as passively.

To facilitate mass usage of this apparatus, its operation is designed to be very simple. The transmission message is selected by a single adjustment of a variable circuit value. The apparatus is then worn as jewelry, having been designed to be of minimum size. Obviousness of the apparatus, based upon its appearance, can be varied to further individualize it as well as to narrow the transmission message. When two of these apparatuses mutually fall within their spatial sensitivity ranges, an introduction may be signaled. The apparatus will signal an introduction by pulsing an L.E.D. The pulse rate and brightness of the L.E.D. depends upon how closely the transmission messages between apparatuses are atuned. Detuning one apparatus relative to the other results in an increase in the pulsing rate and dimming of the L.E.D.'s until finally they fade out.

It can be seen that unwarranted introductions could be signaled if the transmission message, once set, varied significantly. Therefore the apparatus is designed with additional stabilizing circuitry to give reliable performance over repeated power cyclings, expected supply variations, and normal climatic changes.

Many interference problems are resolved by utilizing infrared transmission and reception; but, toward that same goal, bandpassing elements were incorporated into the design. The lensed optics provide some isolation and spatial selectivity. Self-destruction due to infrared reflections is minimized with circuitry supply isolation. Other objects and advantages of the present invention will become apparent as the description proceeds.

BRIEF DESCRIPTION OF THE DRAWINGS

FIG. 2a shows the output waveform of the variable frequency oscillator.

FIG. 2b shows the output waveform of the pulse generating circuitry.

FIG. 2c is a typical plot of amplitude vs frequency for the output of the pulse detector circuit.

FIG. 2d shows a typical unfiltered output waveform of the difference generating circuitry.

DESCRIPTION OF THE ILLUSTRATED EMBODIMENTS

Figure 1:
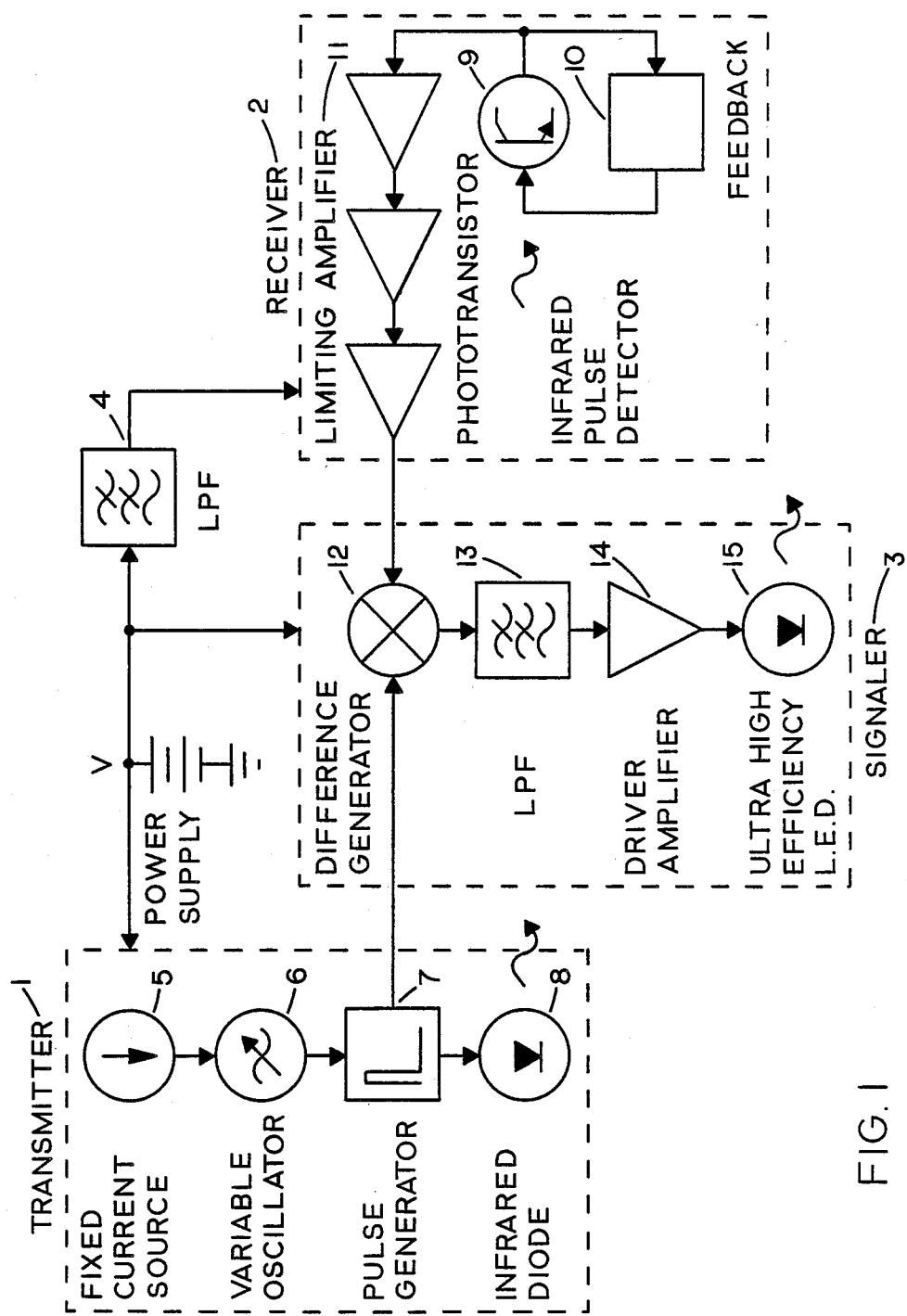
FIG. 1 is a block diagram of the transceiver.

The block diagram of the optical transmitting and receiving apparatus is shown in FIG. 1. The apparatus comprises a transmitter 1 section, a receiver 2 section, and a signaler 3 section. The power source (preferably a lithium battery) is connected directly to the transmitter 1 and signaler 3 section but passes thru a lowpass filter 4 before connection to the receiver 2 section. This arrangement prevents conducted pulses from the transmitter 1 from severely desensitizing the receiver 2. Minimization of power consumption is accomplished thru the use of high efficiency devices and low-power design. The apparatus transmits optical pulses at a frequency chosen by the user and visibly signals when it receives optical pulses at or near the same frequency.

The transmitter 1 section comprises a fixed current source 5, a variable oscillator 6, a pulse generator 7, and an infrared-emitting diode 8. The current source 5 supplies the oscillator 6 only and serves to set and maintain the nominal design frequency of oscillator 6 irreguardless of initial component and voltage supply variations. The oscillator 6 allows user variation of its frequency from the nominal. Its total frequency range should be subdivided into smaller bands with each representing a different message. A typical output waveform of the oscillator 6 is shown in FIG. 2a. The purpose of the pulse generator 7 is to generate and apply narrow (low duty-cycle) current pulses to the infrared diode 8 at the user-chosen oscillator 6 frequency. Narrow pulses allow for a higher signal-to-noise ratio while maintaining a low average-power consumption. A typical output waveform of the generator 7 as dropped across a current limiting resistor is shown in FIG. 2b. The infrared-emitting diode 8 (preferably of the high efficiency GaAlAs type) emits infrared light in proportion to the current applied to it. In a preferred embodiment of the apparatus, diode 8 includes a lensed case so as to further increase the signal-to-noise ratio of its output in a directed spatial region.

The receiver 2 section comprises a phototransistor 9, a feedback network 10, and limiting amplifier stages 11. Phototransistor 9 converts optical pulses from a second apparatus incident upon its base region into electrical pulses in its collector circuit. At the nominal oscillator 6 frequency the phase shift of network 10 allows the electrical pulse's response to peak. A typical plot of output amplitude vs frequency for phototransistor 9 and network 10 is shown in FIG. 2c.

The limiting amplifier stages 11 comprises three capacitively coupled inverting amplifiers, each having shunt load capacitance. The bandpassng and large net gain produce an output of medium duty-cycle and full output swing over a wide range of input duty-cycles and levels.

Signaler 3 section comprises a frequency difference generator 12, a lowpass filter 13, a driver amplifier 14, and an ultra high efficiency L.E.D. 15. The generator 12 produces the difference frequency by switching the pulse generator 7 output under the control of the receiver 2 output. Generator 12 output occurs as bursts of pulses at intervals corresponding to the frequency difference of the two signals. FIG. 2d. illustrates the short rise time associated with said burst which occur even for very low frequency differences. The lowpass filter 13 removes the pulses leaving the filtered difference or alert signal. Twice the bandwidth of filter 13 determines the overall received signal bandwidth which is preferably about 60 Hz.

If an alert signal is generated, driver amplifier 14 serves to modulate L.E.D. 15's supply current in response to the same. L.E.D. 15 thus provides the final communication link for the apparatus by flashing. As the alert signal's frequency increases, its level is reduced by lowpass filter 13 and likewise the output of L.E.D. 15. Accordingly a user can quickly ascertain the atunement of his apparatus to that of another by observing L.E.D. 15 and therefore a message is communicated. To prevent unecessary power drain amplifier 14's sourcing current should be limited.

Figure 3:
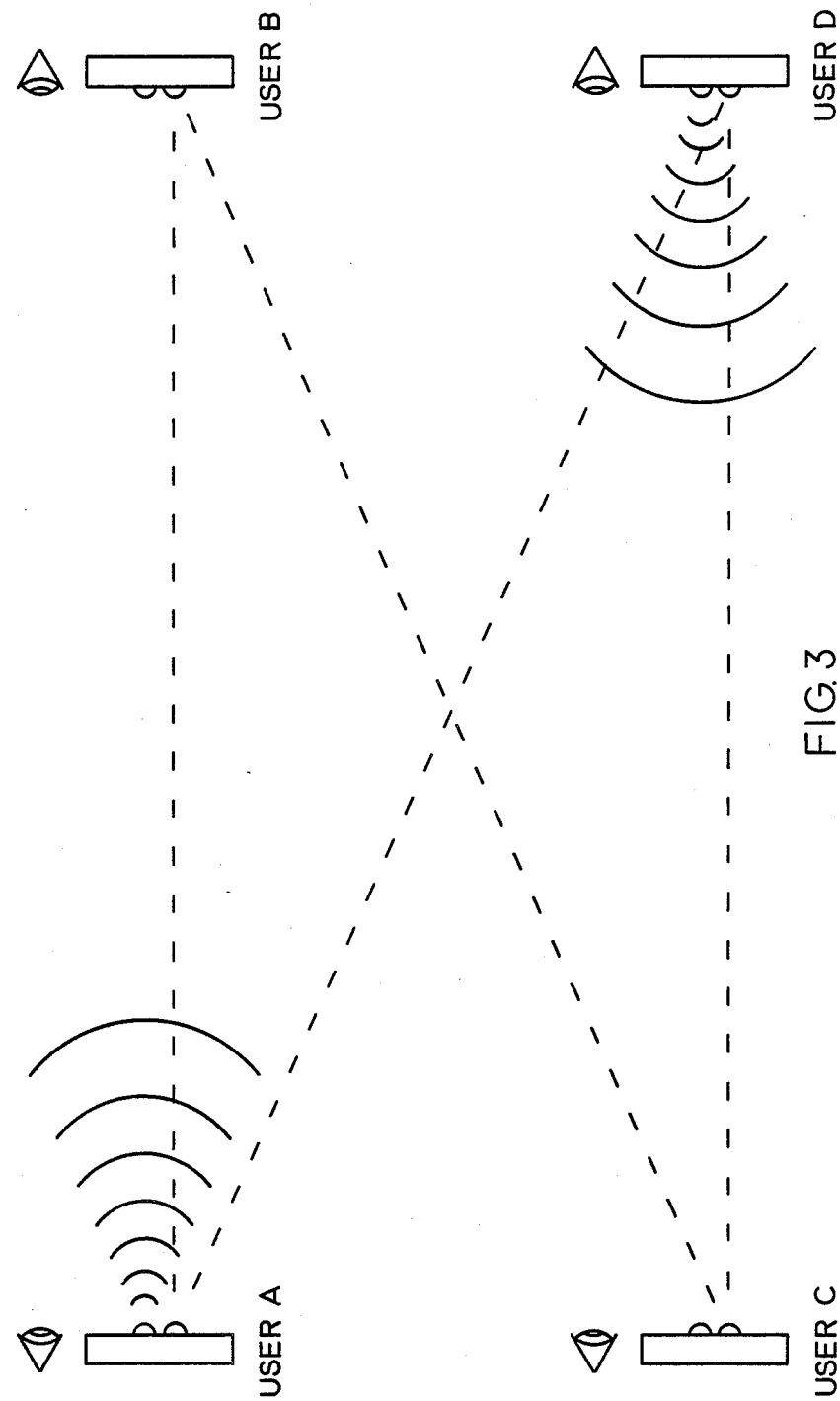
FIG. 3 shows the preferred method of usage of the apparatus with communication links indicated.

FIG. 3. illustrates the communication links between four apparatuses and their users. The dashed lines indicate the transmission paths of infrared pulses while the concentric waves indicate visible L.E.D.'s flashing. All users knowing of a universal frequency vs message relationship for their apparatuses have secretly set their oscillator 6 frequencies for the type of personal message in which they are interested. Apparatus "A" transmits to "B" and "D", apparatus "B" transmits to "A" and "C", apparatus "C" transmits to "B" and "D", and apparatus "D" transmits to "A" and "C". Coincidentally atuned, apparatus "A" alerts user "D" while apparatus "D" alerts to user "A". User "A" and "D" have a common interest.

Figure 4:
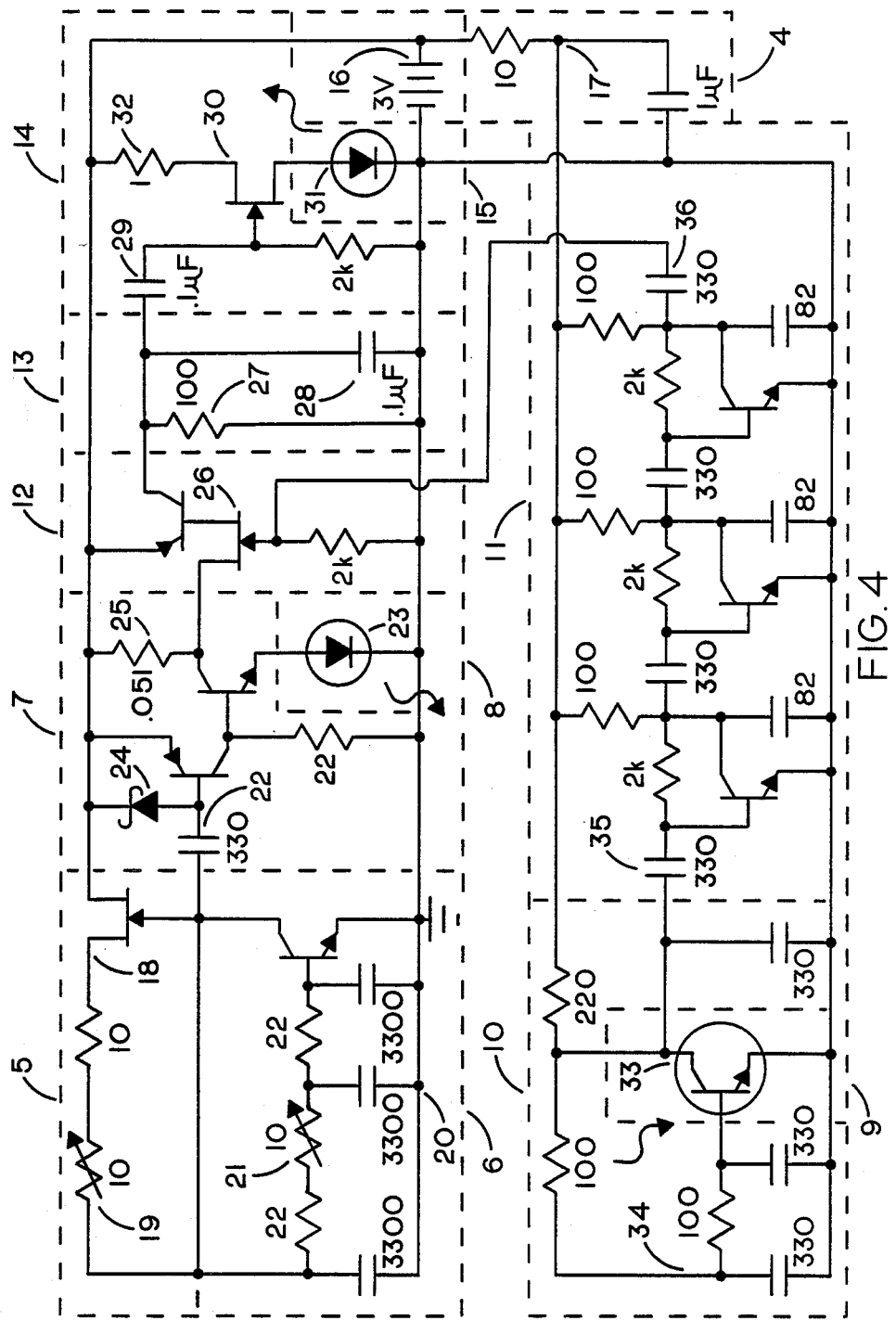
FIG. 4 is a detailed schematic of the transceiver showing preferred circuit values.

FIG. 4. includes the preferred circuit values for the detailed schematic which is the apparatus. The lower half of FIG. 4. comprises the receiver 2 section while the left and right portions of the upper half comprises the transmitter 1 and signaler 3 sections respectively. The 3 V battery 16 is included to help illustrate the routing of power to the various sections of the apparatus. The resistor and capacitor of network 17 comprises lowpass filter 4. All bipolar transistors of FIG. 4 are selected to have a minimum D.C. gain of 50 at 100 micro-Amps of collector current. Resistance values are in kilo-Ohms and capacitance values are in pico-Farads unless otherwise indicated.

Fixed current source 5 comprises JFET circuit 18 and supplys approximately 100 micro-Amps to oscillator 6. Variable resistor 19 provides sourcing adjustment so that the nominal output frequency of oscillator 6 can be calibrated.

Oscillator 6 comprises the "R-C" phase shift oscillator of circuit 20. As part of circuit 20, variable resistor 21 (a single-turn potentiometer) provides a near linear variation of output frequency with wiper rotation angle. Therefore the desired message signal (frequency) can be selected on the basis of the wiper angle alone. The output of oscillator 6 as shown in FIG. 2a. is approximately 1 Vpp. Given the values in circuit 20, the nominal output frequency is about 10 kHz.

Capacitor 22 is the input to pulse generator 7 which is comprised of two class "C" biased stages. While the nonlinear current vs voltage relationship of infrared diode 23 contributes to the sharpness of the output pulse, the pulse width is heavily influenced by the charging and discharging time constants of capacitor 22 thru the antiparallel input diodes. A medium-barrier schottky as diode 24 was chosen over "pn" types for consistency of operation at low supply. Output pulse widths of 8 percent duty-cycle can be obtained. The electrical pulses of FIG. 2b are the voltage drops across current limiting resistor 25. The peaks correspond to a current of about 34 mA which by passing thru diode 23 causes optical pulses to be generated also.

Frequency difference generator 12 comprises a common source JFET 26 and D.C. coupled common emitter stage. JFET 26 is selected such that the magnitude of its pinch-off voltage is less than the supply; therefore, when a squarewave of peak-to-peak swing equal to the supply is A.C. coupled to its resistivity grounded gate, pinch-off during some portion of the waveform will occur. JFET 26 will thus switch from source to drain said electrical pulses in repetitious bursts under the control of the received signal and corresponding to the difference in frequency of the two. An amplified and limited burst dropped across resistor 27 is shown in FIG. 2d. When filtering capacitor 28 is paralleled with resistor 27 (forming lowpass filter 13) all frequencies higher than several octaves above the cutoff are removed from the output or alert signal. Since capacitor 28 is charged by the current source of the common emitter amplifier, short rise times are maintained. Said short rise times allow for a reasonable value of coupling capacitor 29 to the driver amplifier 14 stage.

Driver amplifier 14 comprises JFET 30 in a common drain configuration. The source load comprises L.E.D. 31. JFET 30 is selected to have a pinch-off voltage not much greater than the forward voltage drop of L.E.D. 31 thus permitting minimum D.C. current flow. L.E.D. 31 is perceived to be off until an alert signal of sufficient level modulates its current via amplifier 14. To prevent excessive power drain, resistor 32 is provided to limit diode 31's current to about 1 mA.

The receiver 2 section of the apparatus as depicted in the lower half of FIG. 4. requires that phototransistor 33 convert incident infrared pulses into electrical current pulses. Said electrical current pulses then comprise the detected pulses. Because detected pulses may be derived from a variety of infrared sources in the environment, "R-C" feedback network 34 is incorporated into the apparatus. Network 34 provides two functions: it stabilizes the D.C. bias point of phototransistor 33; and, it peaks the output response to detected pulses at the nominal operating frequency. A typical response curve is shown in FIG. 2c. Network 34 is designed in conjunction with selected phototransistor 33 and requires that there be an external base connection for the same.

Capacitor 35 couples the detected pulses into the first of three identical amplifier stages. Each stage is biased with negative feedback that limits the D.C. voltage gain to about one. The series input and shunt output capacitors of each stage provide bandpassing around the nominal operating frequency. Bandpassing has the effect of shaping a low duty-cycle signal into one or near 50 percent duty-cycle. The three amplifier stages amplify the detected pulses to a maximum level limited by the supply. Limiting has the effect of squaring the output and thus produces short rise and fall times. The limited output signal from the third amplifier stage is of sufficient level to drive the frequency difference generator 12 thru capacitor 36.

Although a specific embodiment of this apparatus has been shown and described, it will be understood that various modifications may be made without departing from the spirit and scope of this apparatus as set forth in the following claims.

I claim:

1. An optical transmitting and receiving apparatus comprising:
    variable oscillator means capable of producing a periodic electrical signal at various selectable frequencies each of which representing a known message among users of the device;
    selection means allowing a user to select one of said frequencies and therefore a message to communicate;
    stability means capable of minimizing frequency changes in said oscillator due to voltage supply variations;
    means responsive to said oscillator and capable of generating electrical pulses at the user selected oscillator frequency;
    means responsive to said oscillator and capable of generating optical pulses at the user selected oscillator frequency for transmission to a second device;
    detection means capable of converting optical pulses transmitted from a second device into electrical pulses;
    conditioning means capable of bandpassing and amplifying the detected electrical pulses into a high level received signal;
    means capable of producing a difference signal which frequency is the absolute difference of said received signal and the user selected oscillator frequency and which amplitude decreases as said frequency difference increases;
    means responsive to said difference signal and capable of alerting the user to the production of the same.

2. The apparatus in accordance with claim 1 wherein the variable oscillator means contains an "R-C" phase shift oscillator.

3. The apparatus in accordance with claim 2 wherein the selection means comprises a user variable resistance in the "R-C" phase shift network.

4. The apparatus in accordance with claim 2 wherein the stability means contains a JFET current source supplying power to the variable oscillator means.

5. The apparatus in accordance with claim 1 wherein the means for generating optical pulses contains an infrared-emitting diode.

6. The apparatus in accordance with claim 1 wherein the means for detecting optical pulses comprises:
    a phototransistor having an external base connection; and an "R-C" feedback network providing D.C. bias and A.C. selectivity.

7. The apparatus in accordance with claim 1 wherein the means for producing a difference signal utilizes a JFET as a switching element.

8. The apparatus in accordance with claim 1 wherein the means responsive to said difference signal and capable of alerting the user utilizes a light emitting diode.

9. The apparatus in accordance with claim 1 and worn on one's person.

* * * * *